United States Patent
Lewis

(10) Patent No.: US 12,130,017 B1
(45) Date of Patent: Oct. 29, 2024

(54) MULTI-PURPOSE GRILL SYSTEM

(71) Applicant: William Dwight Lewis, Clarksville, TN (US)

(72) Inventor: William Dwight Lewis, Clarksville, TN (US)

( * ) Notice: Subject to any disclaimer, the term of this patent is extended or adjusted under 35 U.S.C. 154(b) by 498 days.

(21) Appl. No.: 17/556,321

(22) Filed: Dec. 20, 2021

Related U.S. Application Data

(63) Continuation-in-part of application No. 17/086,359, filed on Oct. 31, 2020, now abandoned.

(51) Int. Cl.
| | | |
|---|---|---|
| *F24B 1/00* | (2006.01) | |
| *F24B 5/02* | (2006.01) | |
| *F24B 13/00* | (2006.01) | |
| *F24B 13/02* | (2006.01) | |

(52) U.S. Cl.
CPC ............ *F24B 1/003* (2013.01); *F24B 13/002* (2013.01); *F24B 13/02* (2013.01); *F24B 5/021* (2013.01)

(58) Field of Classification Search
None
See application file for complete search history.

(56) References Cited

U.S. PATENT DOCUMENTS

| | | | | |
|---|---|---|---|---|
| 6,843,649 B2 * | 1/2005 | Hart | ..................... | A47J 37/0713 |
| | | | | 431/126 |
| D954,237 S * | 6/2022 | Lin | .............................. | D23/332 |
| 2004/0033461 A1* | 2/2004 | Hart | ..................... | A47J 37/0713 |
| | | | | 431/126 |
| 2015/0107578 A1* | 4/2015 | Duerr | ...................... | F24B 1/191 |
| | | | | 126/500 |
| 2018/0119960 A1* | 5/2018 | Fisher | ...................... | F24B 1/202 |
| 2021/0180792 A1* | 6/2021 | Kovar | ...................... | F24B 1/192 |

* cited by examiner

*Primary Examiner* — David J Laux
(74) *Attorney, Agent, or Firm* — Shane Cortesi

(57) ABSTRACT

A multi-purpose grill is described. The grill may include a housing comprising at least one housing sidewall defining a housing interior. The at least one housing sidewall may include a firebox door and a firebox opening leading to the housing interior. The grill may also include a pan that may be located in the housing interior, a cooking grate that may be located above the pan, a removable sleeve and a removable lid that may be located above the cooking grate. The pan may sit on one or more removable rods.

19 Claims, 15 Drawing Sheets

MULTI-PURPOSE GRILL SYSTEM

BACKGROUND

Technical Field

The present invention relates to barbeque grills and bonfires.

Background of the Invention

Grills for cooking food are well-known. For example, in a basic charcoal grill, the grill may include a housing holding charcoal, a cooking grate located above the charcoal, and a removable lid. The grill may also include a host of other features such as a plurality of legs, temperature gauges and the like.

Bonfires are also well-known. In some cases, users merely stand or sit around a plurality of logs on fire. In other embodiments, wood may be burned in a barrel.

U.S. Pat. No. 5,836,298 teaches a portable outdoor fireplace with a fire screen assembly convertible into a cooking grill. The fireplace includes top and bottom cover members and a fire screen assembly containing multiple screens extending vertically there between. The firescreen assembly includes a plurality of supports that support a cooking grate near the entrance of the fireplace at different locations. However, the fireplace does not allow for multiple styles of cooking such as direct heat, indirect heat, or smoking.

U.S. Pat. No. 9,038,620 teaches a multi-sided, portable outdoor fireplace convertible to an open grill, a rotisserie assembly, and a smoker assembly. The fireplace includes a carriage assembly with a pair of rotatable wheels and at least one leg member; a base pan assembly for containing a solid fuel heat source affixed to the carriage assembly; and a removable screen assembly residing on top of the base pan assembly. However, the structure of this portable outdoor fireplace is complex and has many parts.

It would be advantageous to provide a portable, easy-to-use, multi-function grill that has uses in addition to cooking food, such as containing a bonfire.

SUMMARY OF THE INVENTION

The present disclosure provides a multi-purpose grill as described herein.

DETAILED DESCRIPTION

Figure 1:
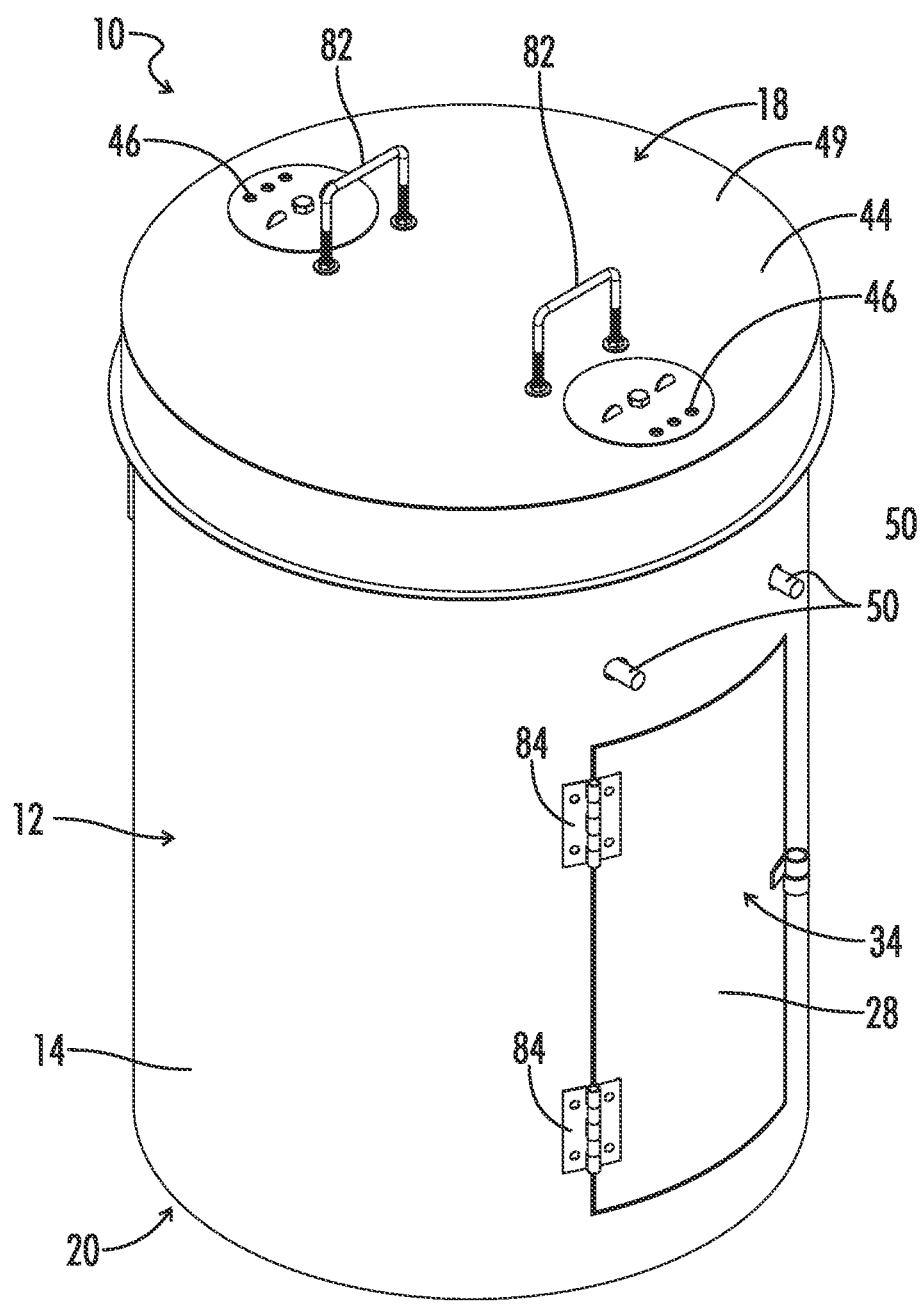
FIG. 1 illustrates a side perspective view of a multi-purpose grill of one embodiment of the present invention.
Figure 2:
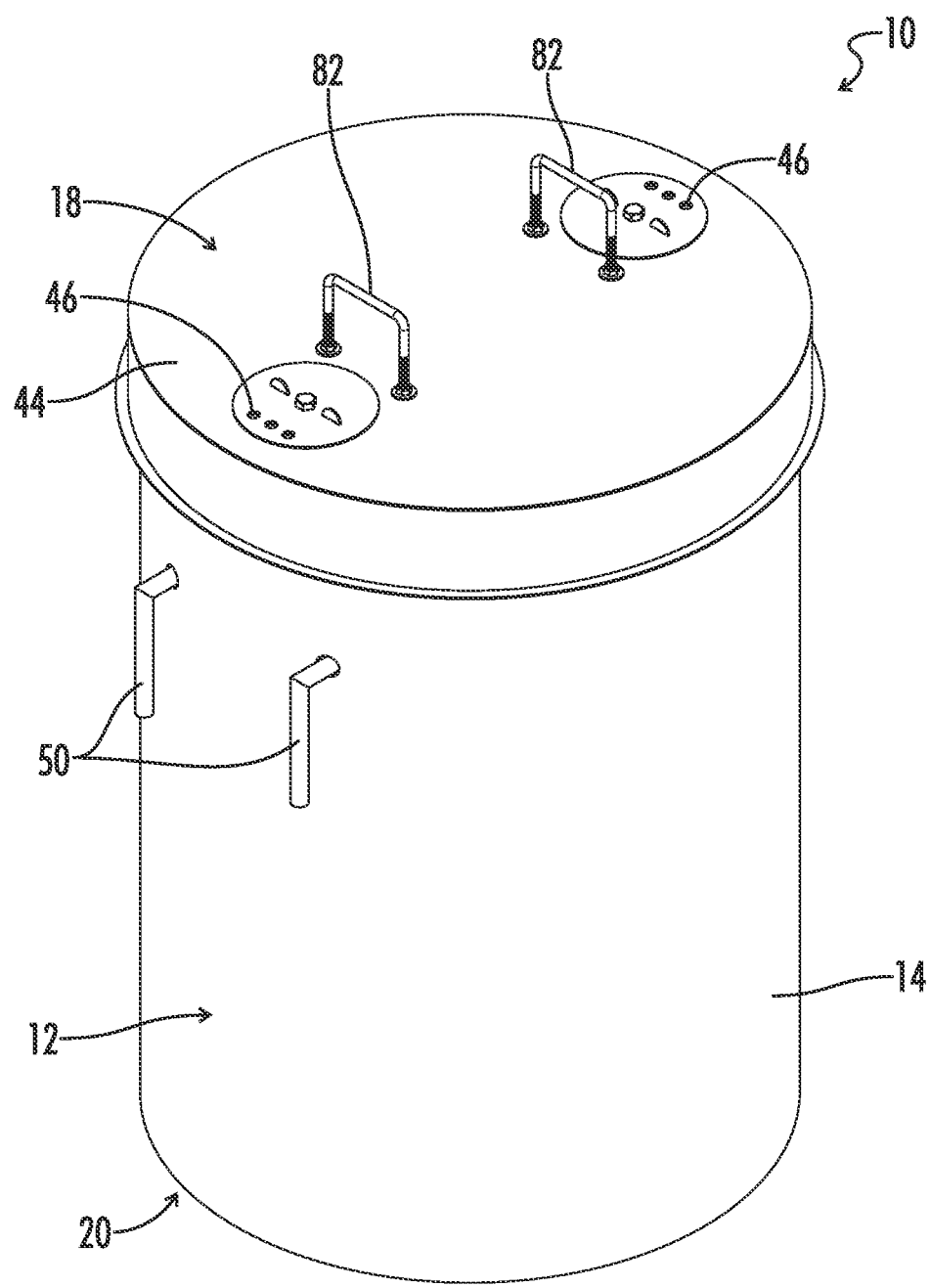
FIG. 2 illustrates another side perspective view of the grill of FIG. 1.

With reference to FIGS. 1-18, the present disclosure provides a multi-purpose grill designated by the numeral 10. In the drawings, not all reference numbers are included in each of the drawings for the sake of clarity. FIGS. 1-18 are drawn generally to scale, however, it will be appreciated that other dimensions are possible.

Figure 3:
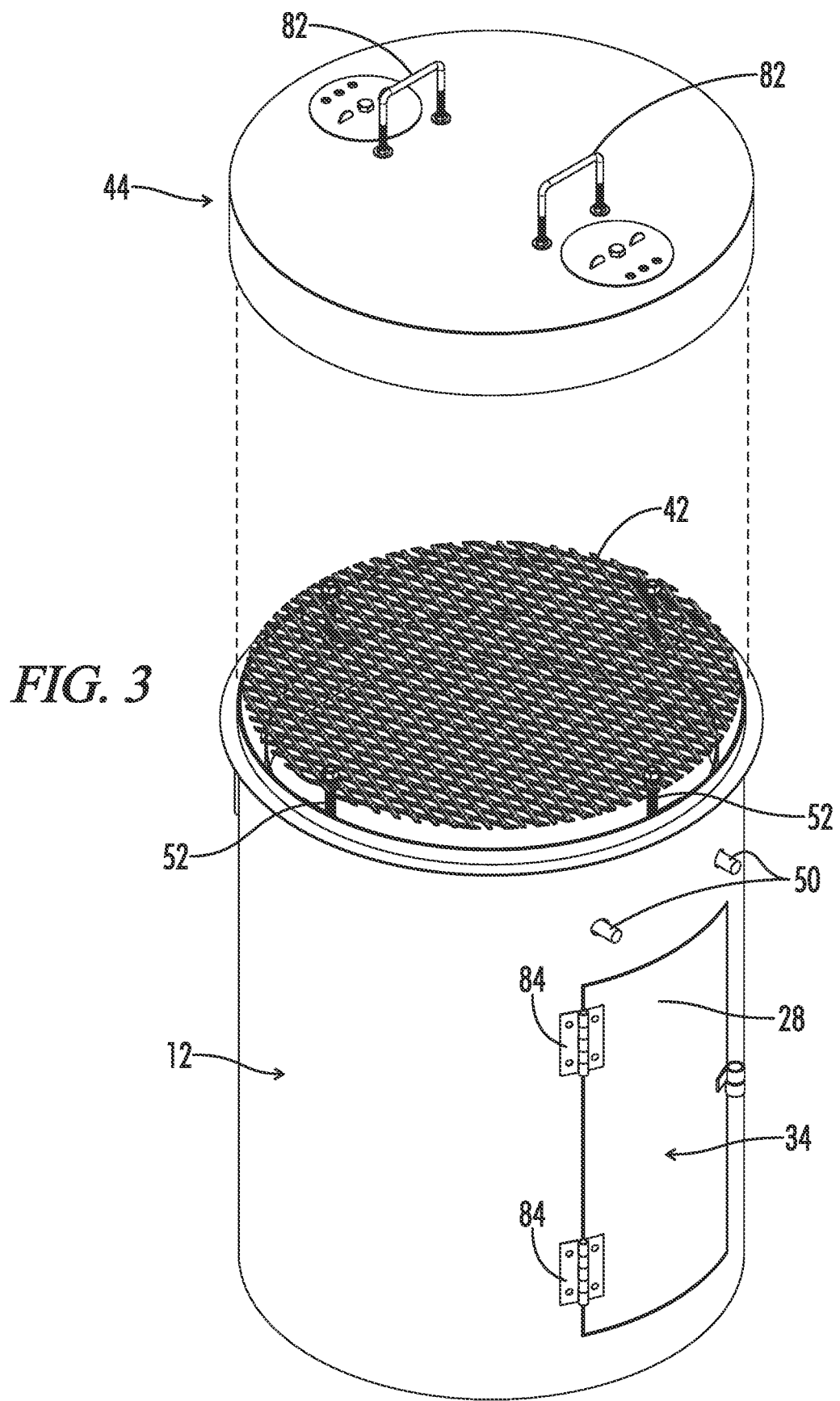
FIG. 3 illustrates a side perspective view of the grill of FIG. 1 with the lid removed.
Figure 4:
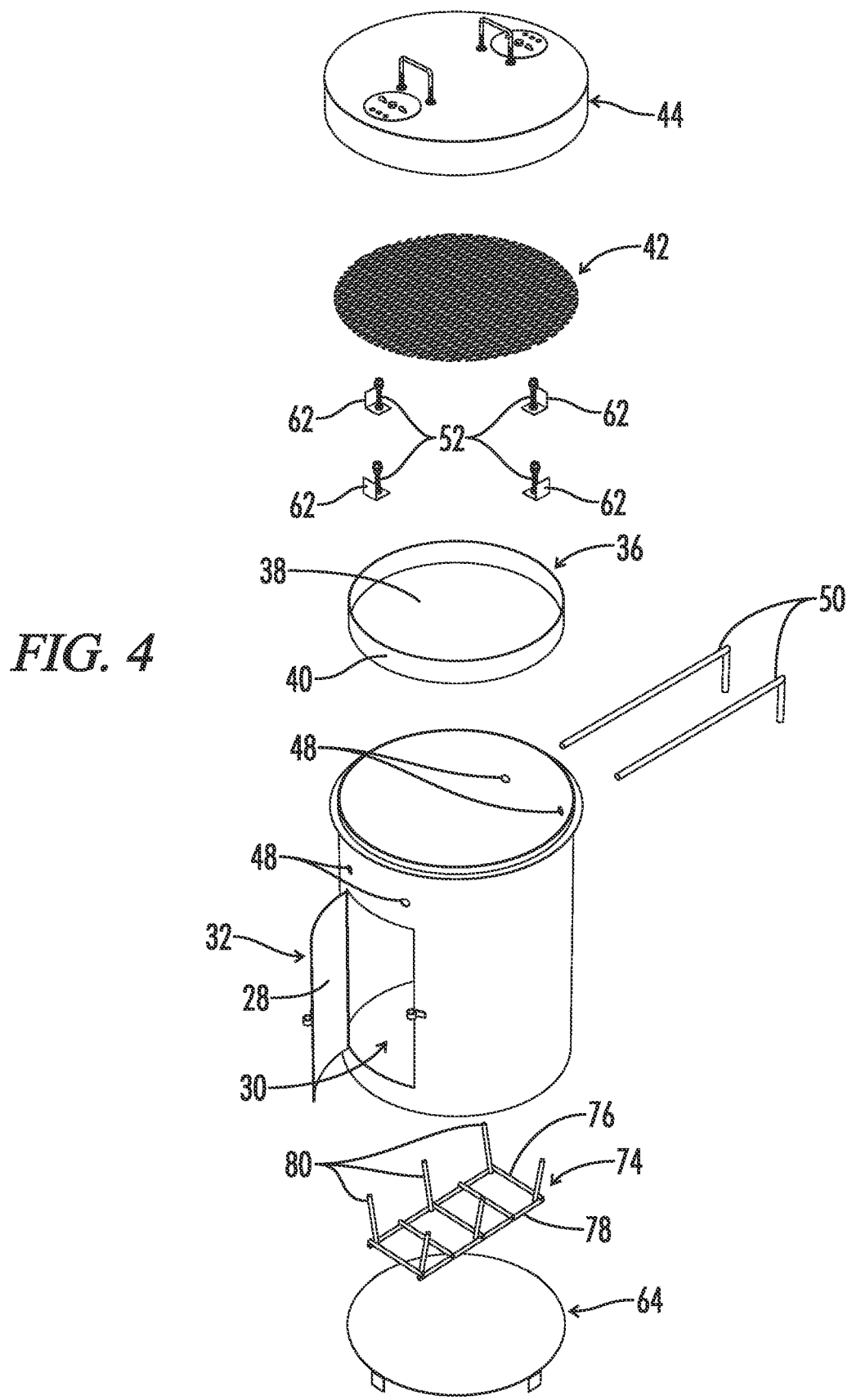
FIG. 4 illustrates a side, exploded perspective view of the grill of FIG. 1.
Figure 5:
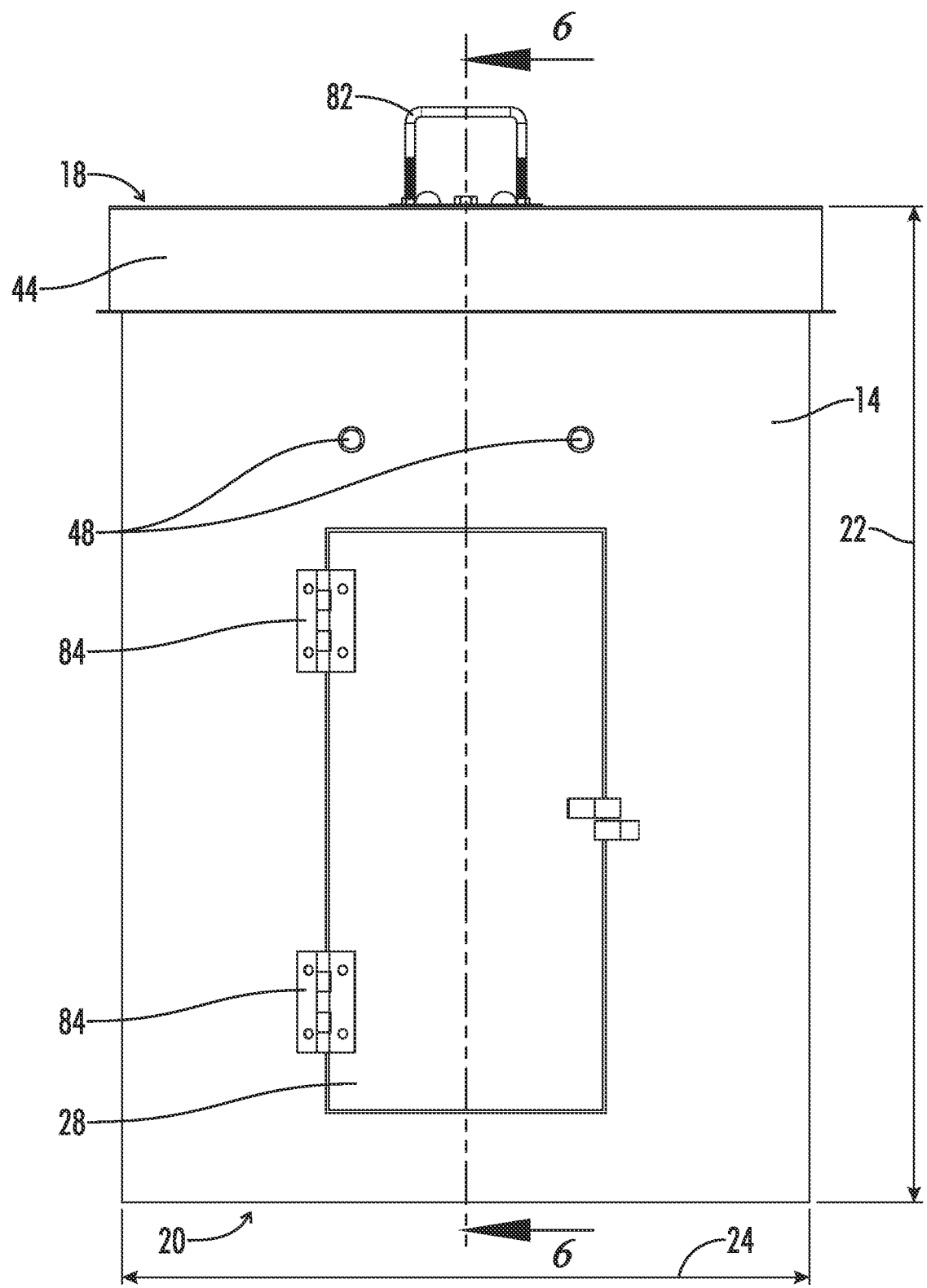
FIG. 5 illustrates a side elevation view of the grill of FIG. 1.
Figure 6:
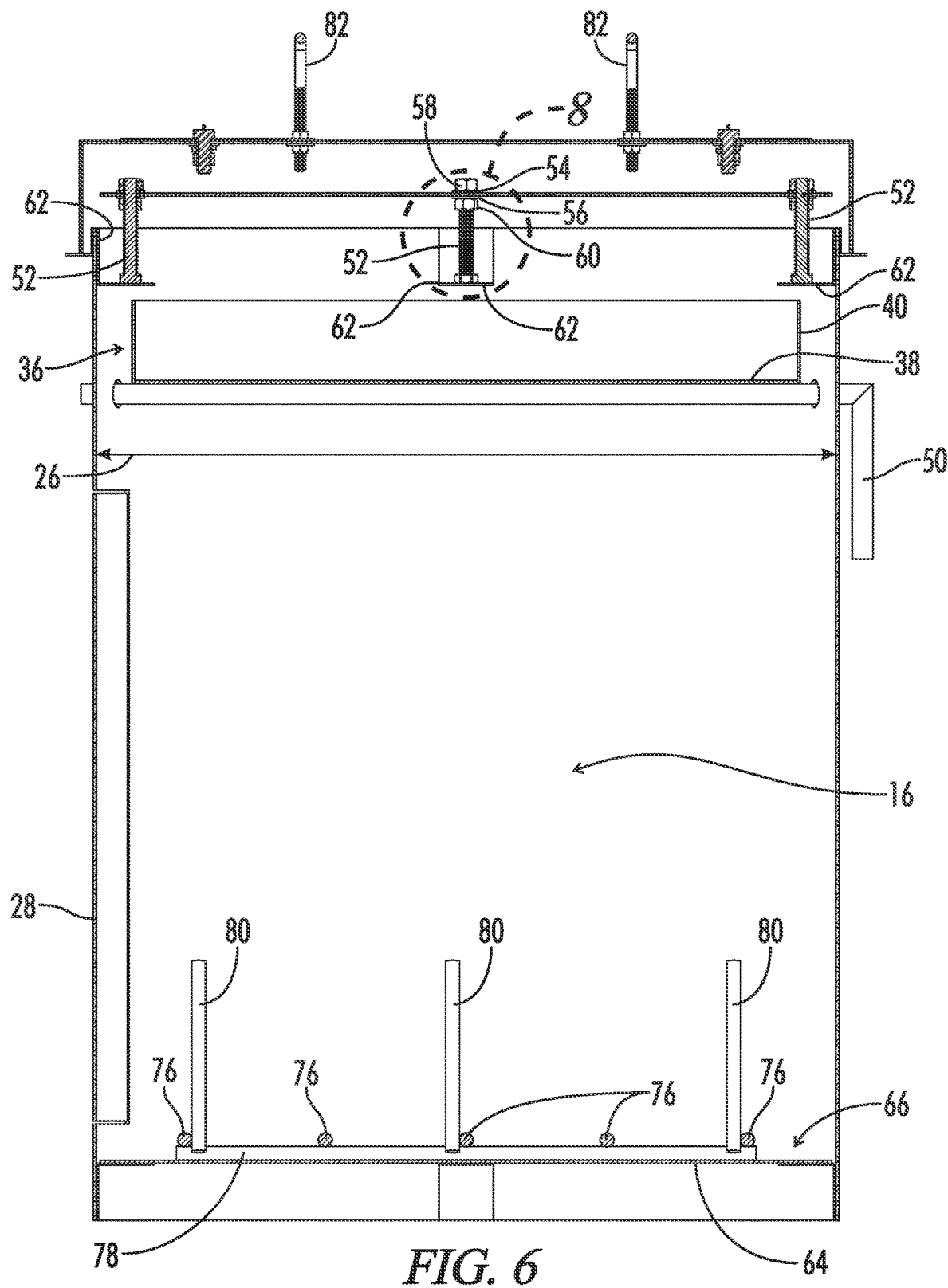
FIG. 6 illustrates a sectional view of the grill of FIG. 5 taken along line 6-6 of FIG. 5.

As shown in FIGS. 1-18, the multi-purpose grill 10 may include a housing 12 that may include at least one housing sidewall 14 that may define a housing interior 16, a housing top 18, a housing bottom 20, a housing height 22 extending from the housing top 18 to the housing bottom 20, a housing width 24 perpendicular to the housing height 22, and a housing length 26 perpendicular to the housing width 24 and housing height 22. As shown in FIGS. 1, 3-5, 7, 15 and 17, the at least one housing sidewall 14 may include a firebox door 28 and a firebox opening 30 leading to the housing interior 16. The firebox door 28 may be configured to pivot between an open position 32 in which the door does not cover the firebox opening 30 and a closed position 34 in which the firebox door 28 covers the firebox opening 30. The housing interior 16 may be at least partially hollow. As best seen in FIGS. 4, 6, 7 and 9, the grill 10 may further include a pan 36 located in the housing interior 16. The pan 36 may include a pan bottom wall 38 located below the housing top 18 and at least one pan sidewall 40 extending upward from the pan bottom wall 38. As best seen in FIGS. 3-4 and 6, the grill 10 may also include a cooking grate 42 located above the pan 36. The cooking grate 42 may extend across the housing width 24 and the housing length 26. As best seen in FIGS. 1-6, 9-10 and 15-18, the grill 10 may also include a removable lid 44 located above the cooking grate 42 that may form the housing top 18, the removable lid 44 optionally comprising at least one vent 46. The removable lid 44 may cover the cooking grate 42.

Optionally, to allow for the grill 10 to be used as a bonfire (as explained in greater detail below), the pan 36 is removable, and, the at least one housing sidewall 14 comprises at least two rod holes 48 located on opposite sides of the at least one housing sidewall 14, and the grill 10 further comprising a removable rod 50 removably extending through the at least two rod holes 48, the removable rod 50 located below and supporting the pan bottom wall 38. In the exemplary embodiment of FIGS. 1-18, the at least one housing sidewall 14 comprises four rod holes 48 and two rods 50, each of which removably extends through two rod holes 48. In the exemplary embodiments of FIGS. 1-18, the removable rod 50 is L-shaped with the shorter portion of the L pointing downwards. In the exemplary embodiments of FIGS. 1-18, the removable rod 50 extends across the housing length 26 or housing width 24. When it is said that the at least one housing sidewall 14 comprises at least two rod holes 48 located on opposite sides of the at least one housing sidewall 14, it will be understood that if the housing 12 is rectangular and thus includes four sidewalls 14, the rod holes will be located on two different sidewalls 14 (e.g., left and right or front and back). In such designs with more than one housing sidewalls 14, it will be understood that each housing sidewall 14 does not necessarily include a firebox opening 30.

Optionally, the height of the cooking grate 42 is adjustable. For example, as best seen in the sectional view of FIG. 6, the grill 10 may further comprise at least two bolts 52 extending through the cooking grate 42, each bolt 52 comprising a top washer 54, a bottom washer 56 located below the top washer 54, a top nut 58 located above the top washer 54, and a bottom nut 60 located below the bottom washer 56. Optionally, the cooking grate 42 is located between the top washer 54 and the bottom washer 56 of each of the respective two bolts 52. Optionally, the at least two bolts 52 each rest on a ledge 62 located in the housing interior 16, the ledge 62 located below the bottom nut 60.

Figure 9:
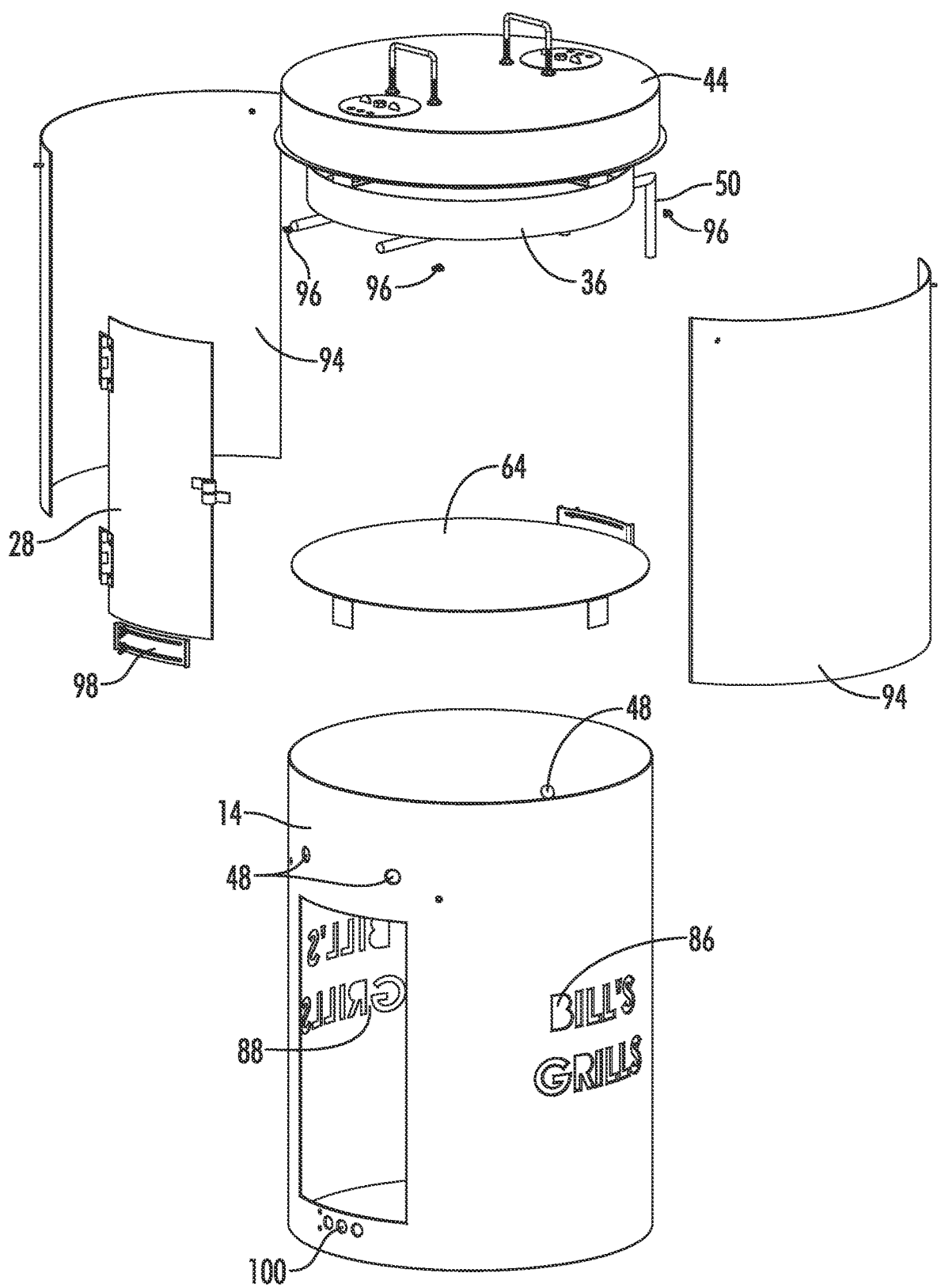
FIG. 9 illustrates a side, exploded perspective view of a multi-purpose grill of another embodiment of the present invention.
Figure 10:
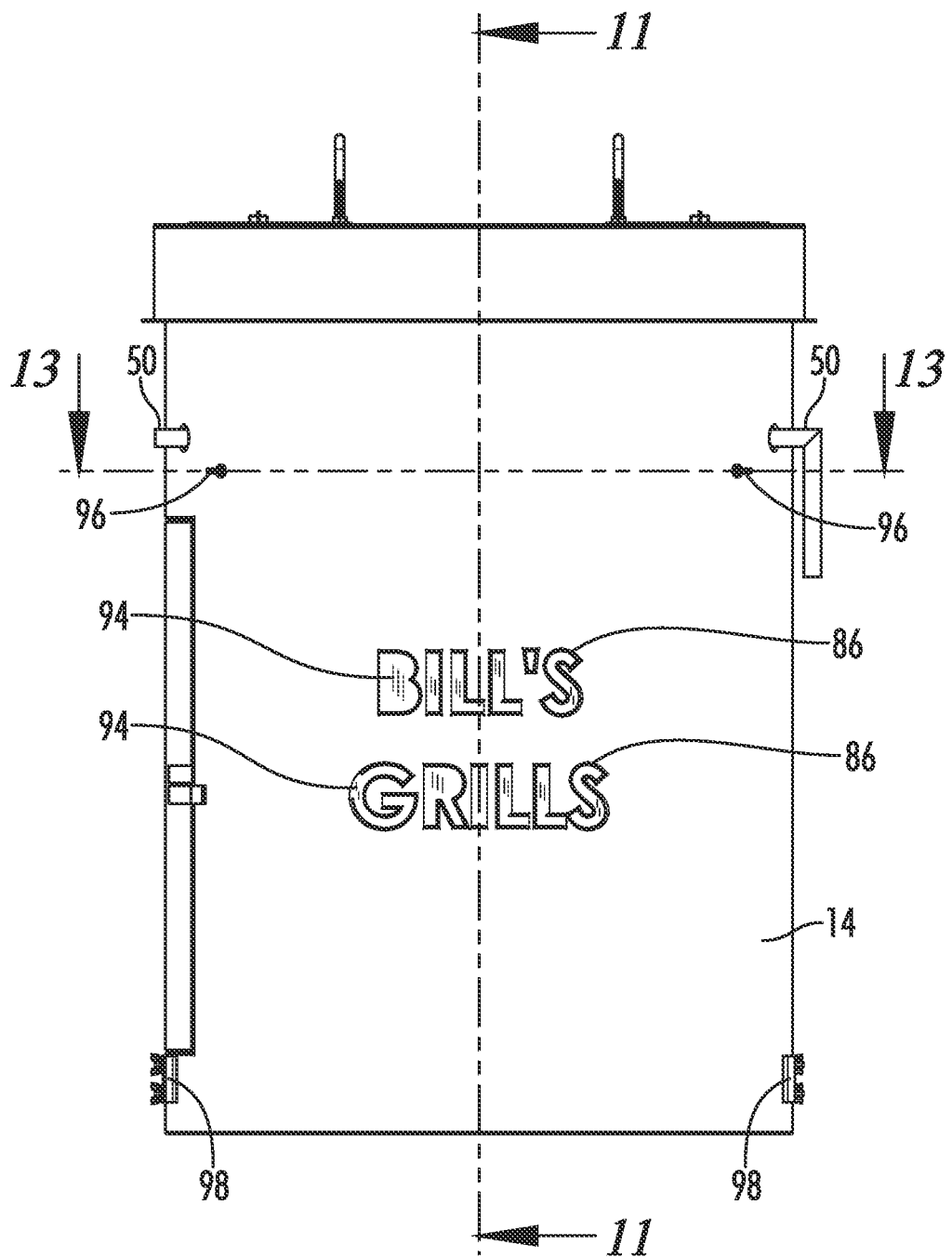
FIG. 10 illustrates a side, perspective view of the multi-purpose grill of FIG. 9.
Figure 11:
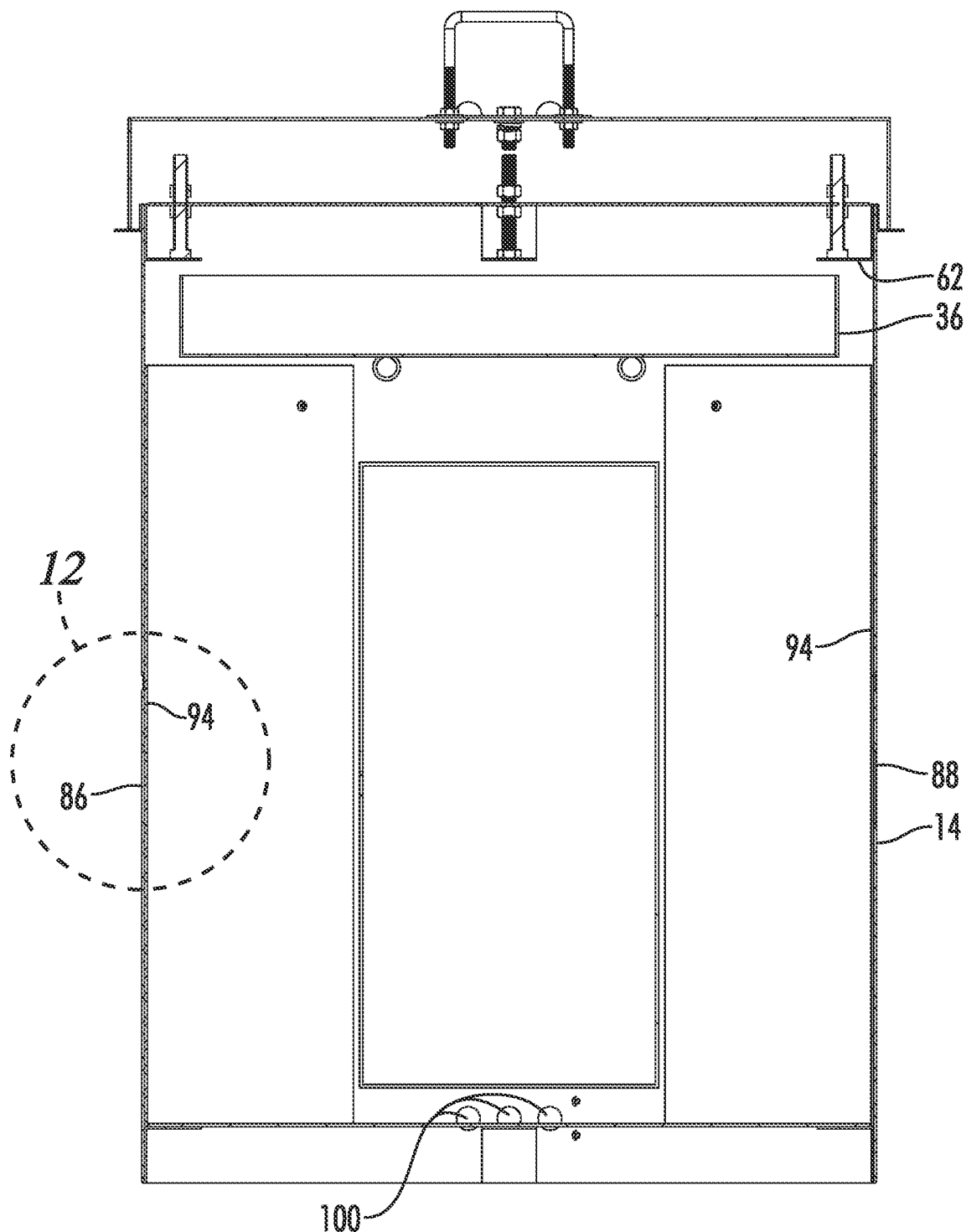
FIG. 11 illustrates a cross-sectional view of the multi-purpose grill of FIG. 10 taken along line 11-11 of FIG. 10
Figure 12:
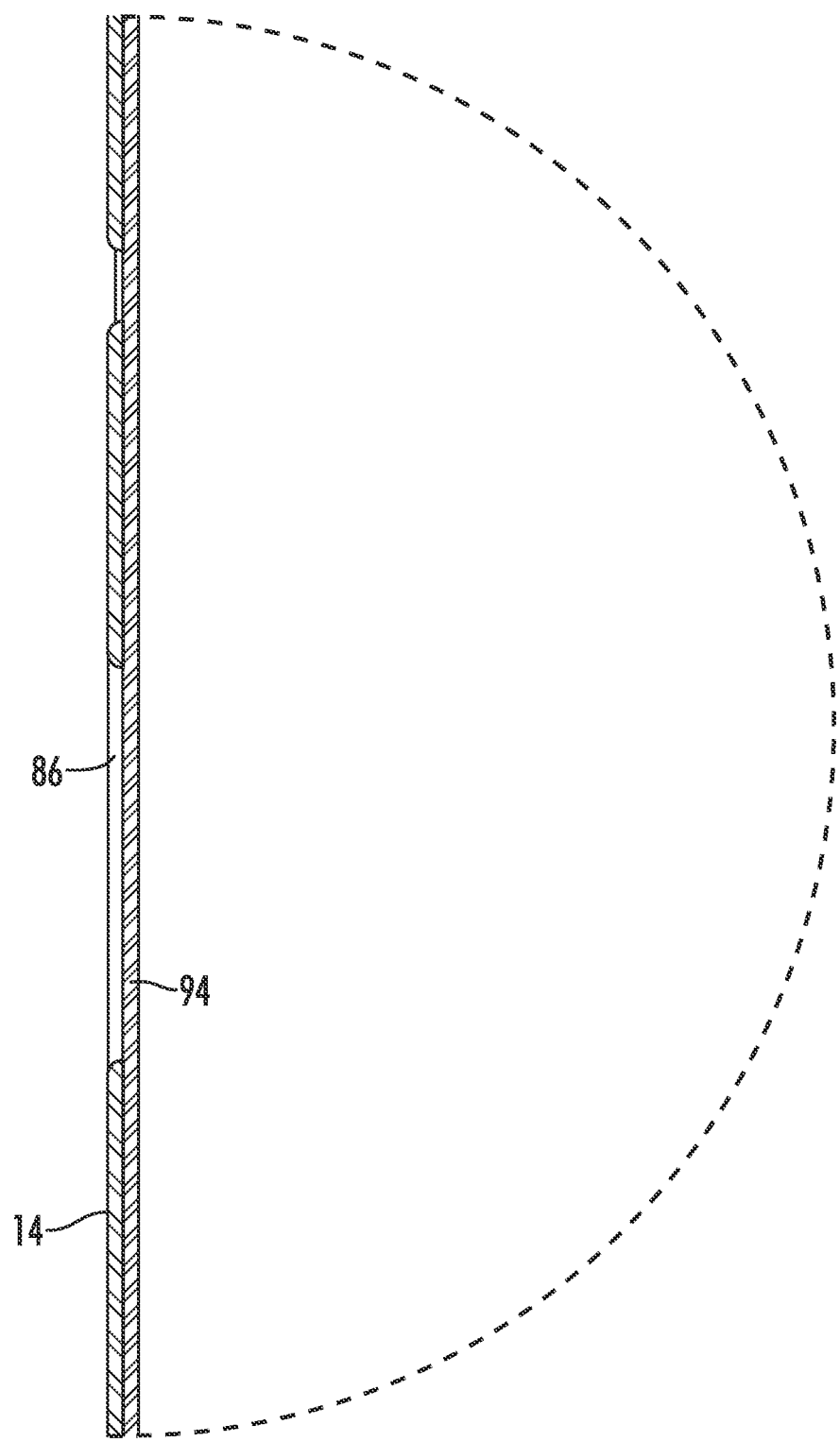
FIG. 12 illustrates a closeup view of the circled area labeled 12 in FIG. 11.
Figure 13:
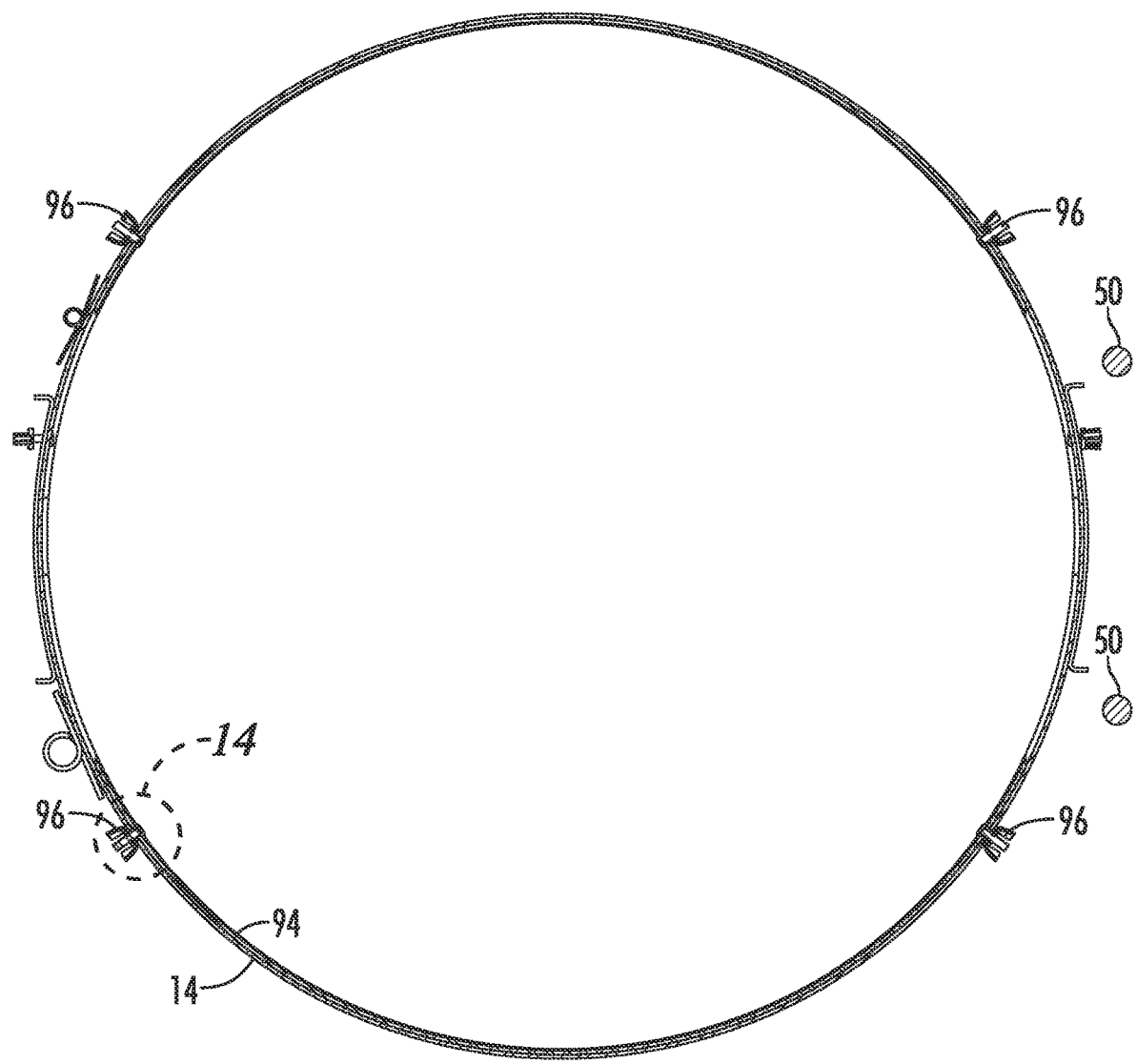
FIG. 13 illustrates a cross-sectional view of the multi-purpose grill of FIG. 10 taken along line 13-13 of FIG. 10.
Figure 14:
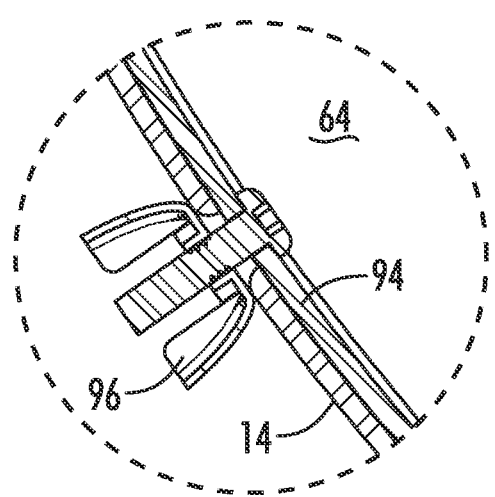
FIG. 14 illustrates a closeup view of the circled area labeled 14 in FIG. 13.
Figure 15:
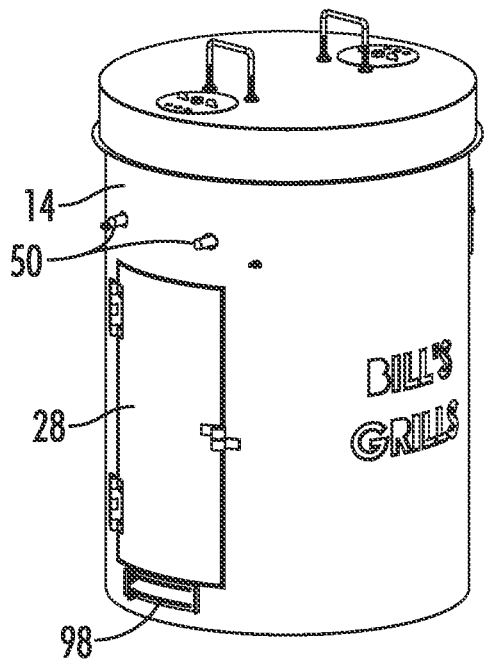
FIG. 15 illustrates a side, perspective view of the multi-purpose grill of FIG. 9 with the damper closed.
Figure 16:
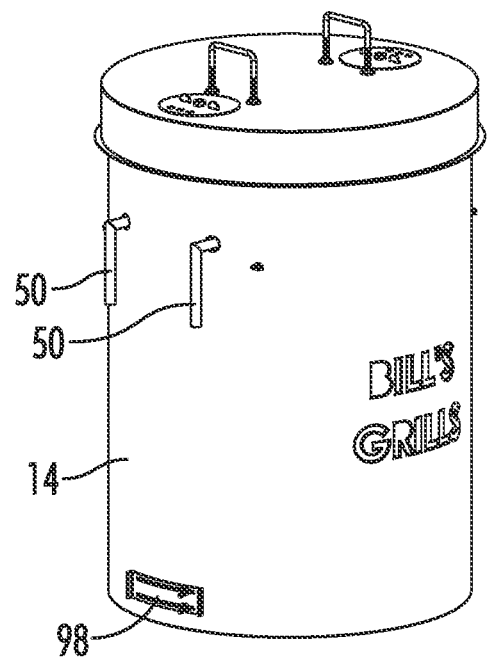
FIG. 16 illustrates another side, perspective view of the multi-purpose grill of FIG. 9 with the damper closed.
Figure 17:
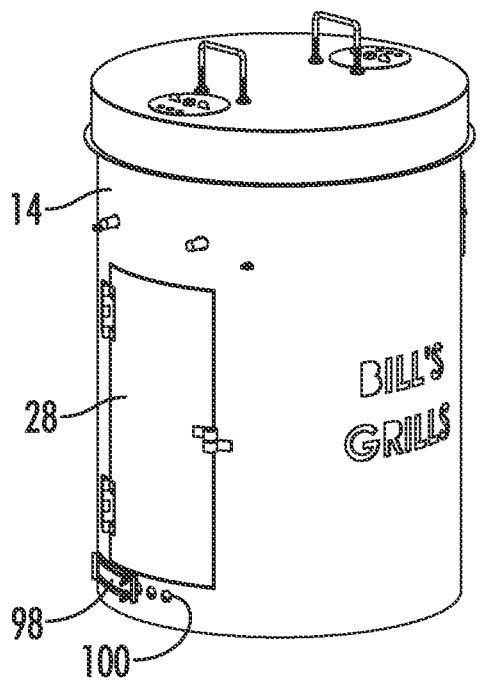
FIG. 17 illustrates another side, perspective view of the multi-purpose grill of FIG. 9 with the damper open.
Figure 18:
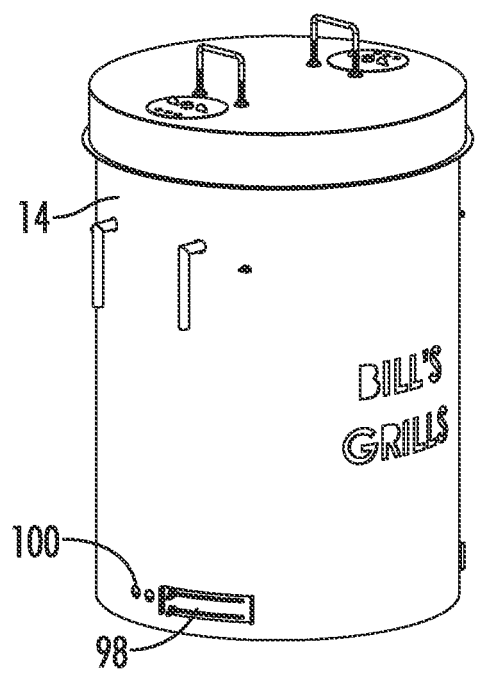
FIG. 18 illustrates another side, perspective view of the multi-purpose grill of FIG. 9 with the damper open.

Optionally, as best seen in FIGS. 4, 6 and 9, the housing 12 further comprises a bottom wall 64 forming a bottom 20 of the housing interior 16. Optionally, the bottom wall 64 is removable. The firebox opening 30 can be any suitable shape, including without limitation, circular, ovular, or rectangular. Optionally, the longest dimension of the firebox opening 30 is sized so that the bottom wall 64 may pass through the firebox opening 30. For example, for a rectangular firebox opening 30, the longest dimension would be the diagonal of the rectangle; for a circular firebox opening 30, the longest dimension would be the diameter of the circle; for an ovular firebox opening 30, the longest dimension would be the major axis. Relatedly, the bottom wall 64 also comprises a shortest dimension sized so that the bottom wall 64 may pass through the firebox opening 30. For example, for a circular bottom wall 64, the shortest dimension is the diameter; for a rectangular bottom wall 64, the shortest dimension is the length of the shortest side of the rectangle; for an ovular bottom wall 64, the shortest dimension is the minor axis of the oval. A person having ordinary skill would be able to determine the longest and shortest dimensions, for other shaped firebox openings 30 and bottom walls 64. Optionally, the longest dimension of the firebox opening 30 is greater than the shortest dimension of the bottom wall 64 to allow for removal of the bottom wall 64 through the firebox opening 30. Without being bound for any particular theory, addition or removal of the bottom wall 64 through the firebox opening 30 allows a user to increase or decrease the ventilation in the grill during cooking without lifting the housing 12, which may be hot.

The firebox opening 30 can be any suitable shape, including without limitation, circular, ovular, or rectangular.

Optionally, as best seen in FIG. 4, the housing interior 16 comprises a fire grate 74 configured to hold wood. The fire grate 74 may be positioned on the bottom wall 64. The fire grate 74 may include a first set of fire grate rods 76 lying in the plane formed by the housing width 24 and housing length 26, a second set of fire grate rods 78 lying in the plane formed by the housing width 24 and housing length 26 and perpendicular to the first set of fire grate rods 76, and a third set of fire grate rods 80 extending upwards out of the plane formed by the housing width 24 and housing length 26 and forming at least a thirty degree angle therewith. Optionally, like the removable bottom wall 64, the fire grate 74 is sized to be moved through the firebox opening 30 when the firebox door 28 is in the open position 32. Optionally, the fire grate 74 is holding wood.

Optionally, the housing 12 and the pan 36 are comprised of metal and are configured to withstand temperatures of at least 400 degrees Fahrenheit.

Optionally, as best seen in FIGS. 3-4, the housing 12 is cylindrical and the cooking grate 42 is circular.

Optionally, the at least one vent 46 is closeable.

Optionally, as best seen in FIGS. 1-6, 9-11 and 15-18, the lid 44 comprises a substantially flat top 49, the substantially flat top 49 comprising a handle 82. Optionally, the lid 44 includes a temperature gauge 90 to inform the user of the temperature inside the grill 10. Such temperature gauges 90 are well-known in the art.

Optionally, the firebox opening 30 comprises a longest dimension of at least 3 inches.

Figure 7:
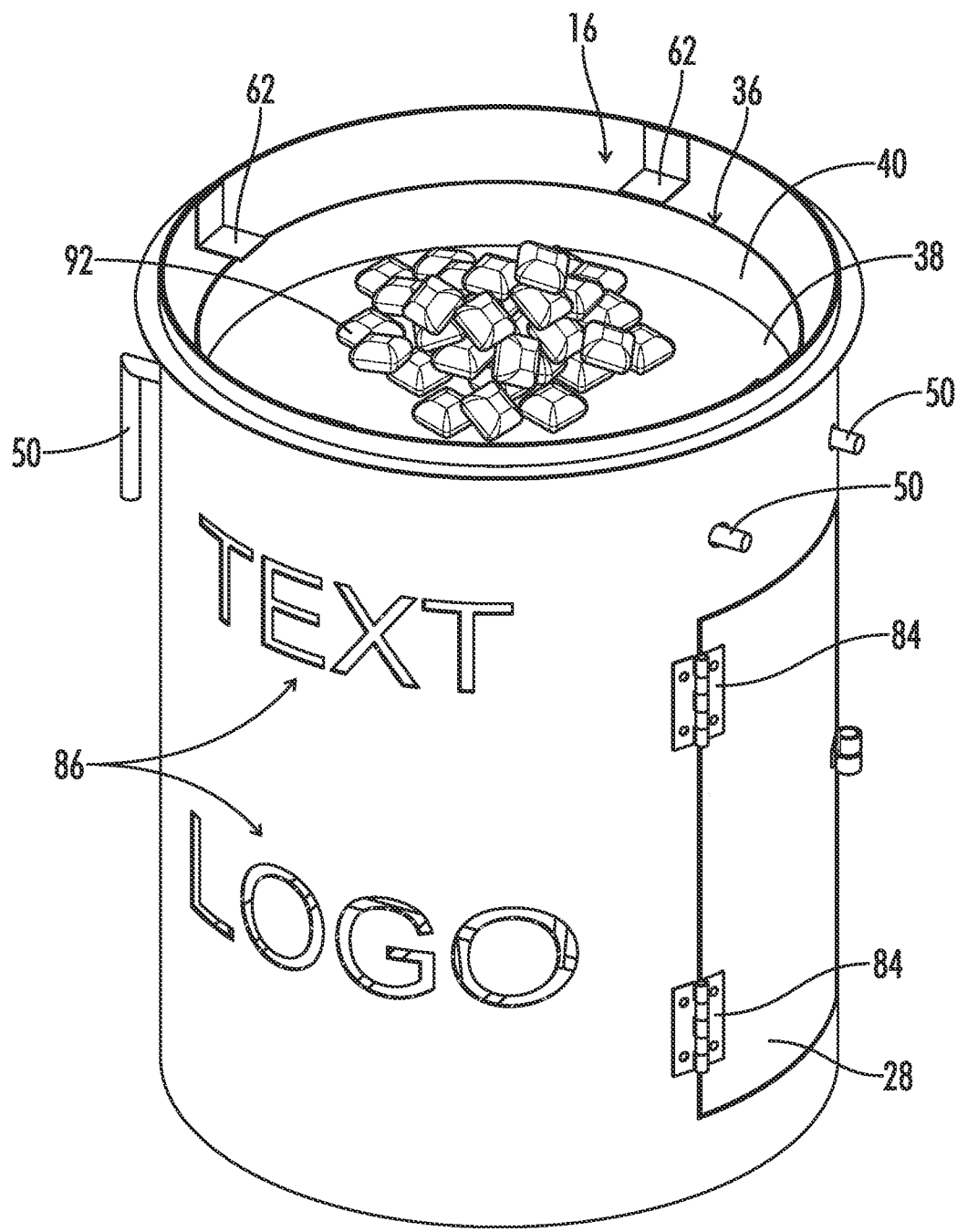
FIG. 7 illustrates a side perspective view of a multi-purpose grill of another embodiment of the present invention with the lid removed.
Figure 8:
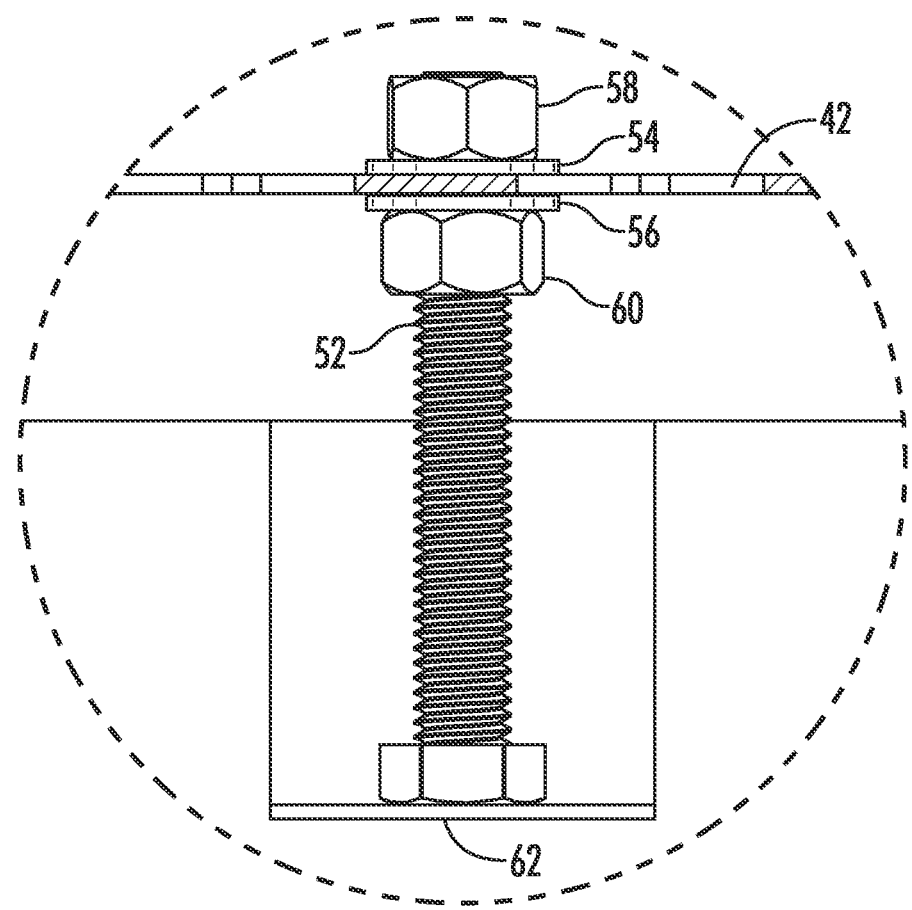
FIG. 8 illustrates a closeup sectional view of the circled area labelled 8 in FIG. 6.

Optionally, as shown in FIG. 7, the pan 36 comprises charcoal 92 for cooking. Alternatively, the pan 36 may include other materials for cooking such as water or other liquid.

Optionally, as best seen in FIGS. 1, 3, 5 and 7, the grill 10 further includes a hinge 84 connected to the firebox door 28 and with a pivot axis extending generally parallel to the housing height 22, the hinge 84 configured to allow the door 28 to move between the open and closed positions 32, 34.

Optionally, the grill 10 may be used as a bonfire. For example, a fire may be located in the housing interior 16. More particularly, as shown in FIGS. 7, 9-10 and 15-18, the at least one housing sidewall 14 may include a first set of design holes 86 arranged in a pattern configured to allow a viewer on the outside of the housing 12 to view a fire in the housing interior 16. The first set of design holes 86 also may be configured to allow heat from the fire to escape the housing interior 16 and provide warmth to the viewer. The first set of design holes 86 may create text and/or graphics.

Optionally, the at least one housing sidewall 14 further comprises a second set of design holes 88 arranged in a pattern and configured to allow a viewer on the outside of the housing 12 to view a fire in the housing interior 16. The second set of design holes 88 may be further configured to allow heat from the fire to escape the housing interior 16 and provide warmth to the viewer. The second set of design holes may be located on an opposite side of the at least one housing sidewall 14 as compared to the first set of design holes 86. As is the case with the rod holes 48, the first and second set of design holes 86 may be located in different sidewalls 14 (e.g., front and back or left and right) if the grill includes more than one housing sidewall 14.

Optionally, the first set of design holes 86 have a combined surface area of at least one square foot. Optionally, the first set of design holes 86 is located below the at least two rod holes 48. Optionally, except for the first and second set of design holes 86 and 88, the firebox opening 30 and the rod holes 48, the at least one housing sidewall 14 is solid metal.

As shown in the embodiment of FIGS. 9-18, the housing interior 16 may include one or more removable sleeves/liners 94. The removable sleeve(s) 94 may be positioned to cover the first and second set of design holes 86 and 88 to prevent heat from escaping during grilling. The removable sleeve(s) 94 may rest on the bottom wall 64. The removable sleeve(s) may also be secured to the at least one housing sidewall 14 via a fastener 96 such as a wingnut. The removable sleeve(s) 94 may be removed and/or rotated when the grill 10 is used as a bonfire so that the removable sleeve(s) 94 no longer covers the design holes 86 and 88. The removable sleeve(s) may also be curved and may match the curvature of the housing sidewall 14.

As shown in the embodiment of FIGS. 9-18, the grill 10 may also include one or more damper(s) comprised of a moveable plate 98 that can slide to cover damper holes 100 in the housing sidewall 14 to allow air to enter or exit the housing interior 16. The grill 10 may include two dampers located on opposite sides of the at least one housing sidewall 14, as shown in FIGS. 15-18.

The grill 10 may be used in any suitable process, including but not limited to cooking food or creating a bonfire. For example, the grill 10 may be used in a method comprising: a) providing the grill 10; b) placing charcoal 92 in the pan 36 and igniting the charcoal 92; c) placing food on the cooking grate 42; and d) using heat provided by the charcoal 92 to cook the food. The grill may also be used for a method of smoking food wherein the method comprises: a) providing the grill 10; b) placing the pan 36 in the grill 10; c) adding water or other liquids such as juice to the pan 36; d) placing wood and/or charcoal 92 in the housing interior bottom 66 and igniting the wood and/or charcoal 92; e) placing food on the cooking grate 42; f) using heat and smoke provided by the wood and/or charcoal 92 to cook and flavor the food. Optionally, this method may be performed without the water or without the pan or water. Without being bound to any particular theory, using the pan with water, just the pan, or no pan creates different temperature profiles in the grill for different cooking styles.

Alternatively, the grill 10 may be used in a method of creating a bonfire, including: a) providing the grill 10; b) removing the cooking grate 42, pan 36, removable sleeve(s) 94, and lid 44; and c) igniting a fire in the housing interior 16. Optionally, the fire is located on the bottom wall 64. Optionally, the method further comprises, after step d), allowing heat from the fire to escape through the first and set of design holes 86 and 88 (as well as viewing the fire through the first and second set of design holes 86 and 88).

| Part List | |
| --- | --- |
| Grill | 10 |
| Grill housing | 12 |
| Housing sidewall | 14 |
| Housing interior | 16 |
| Housing top | 18 |
| Housing bottom | 20 |
| Housing height | 22 |
| Housing width | 24 |
| Housing length | 26 |
| Firebox door | 28 |
| Firebox opening | 30 |
| Firebox door open position | 32 |
| Firebox door closed position | 34 |
| Pan | 36 |
| Pan bottom wall | 38 |
| Pan sidewall | 40 |
| Cooking grate | 42 |
| Removable lid | 44 |
| Removable lid vent | 46 |
| Rod holes | 48 |
| Removable lid substantially flat top | 49 |
| Removable rod | 50 |
| Bolts | 52 |
| Bolt top washer | 54 |
| Bolt bottom washer | 56 |
| Bolt top nut | 58 |

| Part List (-continued) | |
| --- | --- |
| Bolt bottom nut | 60 |
| Ledge | 62 |
| Housing removable bottom wall | 64 |
| Housing interior bottom | 66 |
| Fire grate | 74 |
| First set of fire grate rods | 76 |
| Second set of fire grate rods | 78 |
| Third set of fire grate rods | 80 |
| Grill lid handle | 82 |
| Hinge | 84 |
| First set of design holes | 86 |
| Second set of design holes | 88 |
| Temperature gauge | 90 |
| Charcoal | 92 |
| Removable sleeve | 94 |
| Sleeve Fastener | 96 |
| Damper plate | 98 |
| Damper holes | 100 |

Having now described the invention in accordance with the requirements of the patent statutes, those skilled in the art will understand how to make changes and modifications to the disclosed embodiments to meet their specific requirements or conditions. Changes and modifications may be made without departing from the scope and spirit of the invention. In addition, the steps of any method described herein may be performed in any suitable order and steps may be performed simultaneously if needed. Use of the singular embraces the plural.

Terms of degree such as "generally", "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

What is claimed is:

1. A multi-purpose grill comprising:
a housing comprising at least one housing sidewall defining a housing interior, a housing top, a housing bottom, a housing height extending from the housing top to the housing bottom, a housing width perpendicular to the housing height, and a housing length perpendicular to the housing width and housing height, the at least one housing sidewall comprising a firebox door and a firebox opening leading to the housing interior, the firebox door configured to pivot between an open position in which the door does not cover the firebox opening and a closed position in which the firebox door covers the firebox opening, wherein the housing interior is at least partially hollow;
a pan located in the housing interior, the pan comprising a pan bottom wall located below the housing top and at least one pan sidewall extending upward from the pan bottom wall;
a cooking grate located above the pan, the cooking grate extending across the housing width and the housing length; and
a removable lid located above the cooking grate and forming the housing top, the removable lid comprising at least one vent,
wherein the pan is located entirely above the firebox door,
wherein the housing further comprises a bottom wall forming a bottom of the housing interior,
wherein the at least one housing sidewall further comprises a first set of design holes arranged in a pattern, wherein the housing interior further comprises a first removable sleeve resting on the housing bottom wall and covering the first set of design holes, the first removable sleeve abutting the at least one housing sidewall and attached to the at least one housing sidewall by a first sleeve fastener, and further wherein, when the first removable sleeve is removed, the first set of design holes are configured to allow a viewer on the outside of the housing to view a fire in the housing interior and are further configured to allow heat from the fire to escape the housing interior and heat the viewer.

2. The grill of claim 1 wherein the at least one housing sidewall is cylindrical, wherein the cooking grate is circular and further wherein the first removable sleeve is semi-cylindrical, and further wherein the first removable sleeve and the at least one housing sidewall have the same radius of curvature.

3. The grill of claim 1 wherein the at least one housing sidewall further comprises a second set of design holes arranged in a pattern, the second set of design holes located on an opposite side of the at least one housing sidewall as compared to the first set of design holes, wherein the housing interior further comprises a second removable sleeve resting on the housing bottom and covering the second set of design holes, the second removable sleeve abutting the at least one housing sidewall and attached to the at least one housing sidewall by a second sleeve fastener, and further wherein, when the second removable sleeve is removed, the second set of design holes are configured to allow a viewer on the outside of the housing to view a fire in the housing interior and are further configured to allow heat from the fire to escape the housing interior and heat the viewer.

4. The grill of claim 3 wherein the at least one housing sidewall is cylindrical, wherein the cooking grate is circular and further wherein the first and second removable sleeve are semi-cylindrical, and further wherein the first and second removable sleeve and the at least one housing sidewall have the same radius of curvature.

5. The grill of claim 4 wherein the first and second removable sleeve are the same shape.

6. The grill of claim 4 wherein the least one housing sidewall further comprises a damper located below the door.

7. The grill of claim 4 wherein the first and second set of design holes have a combined surface area of at least one square foot.

8. The grill of claim 1 wherein the pan is removable and is located above the first removable sleeve, wherein the at least one housing sidewall comprises at least two rod holes located on opposite sides of the at least one housing sidewall, and further wherein the grill further comprises a removable rod removably extending through the at least two rod holes, the removable rod located below and supporting the pan bottom wall.

9. The grill of claim 8 wherein the removable rod is L-shaped and further wherein the removable rod extends across the housing length or housing width.

10. The grill of claim 1 wherein the grill further comprises at least two bolts extending through the cooking grate, each bolt comprising a top washer, a bottom washer located below the top washer, a top nut located above the top washer, and a bottom nut located below the bottom washer, and wherein the cooking grate is located between the top washer and the bottom washer of each of the respective two bolts, wherein the at least two bolts each rest on a ledge located in the housing interior, the ledge located below the bottom nut and located above the first removable sleeve.

11. The grill of claim 1 wherein the bottom wall is removable.

12. The grill of claim 11 wherein the firebox opening comprises a longest dimension, wherein the removable bottom wall comprises a shortest dimension, and further wherein the longest dimension of the firebox opening is greater than the removable bottom wall shortest dimension.

13. The grill of claim 1 wherein the housing interior comprises a fire grate positioned on the bottom wall and configured to hold wood, the fire grate comprising a first set of fire grate rods lying in a plane formed by the housing width and housing length, a second set of fire grate rods lying in the plane formed by the housing width and housing length and perpendicular to the first set of fire grate rods, and a third set of fire grate rods extending upwards out of the plane formed by the first and second set of fire grate rods and forming at least a thirty degree angle therewith, and further wherein the fire grate is sized to be moved through the firebox opening when the firebox door is in the open position.

14. The grill of claim 1 wherein the housing, the first removable sleeve and the pan are comprised of metal and are configured to withstand temperatures of at least 400 degrees Fahrenheit.

15. The grill of claim 1 wherein the at least one vent is closeable.

16. The grill of claim 1 wherein the lid comprises a substantially flat top, the substantially flat top comprising a handle.

17. The grill of claim 1 wherein the firebox opening comprises a surface area of at least nine square inches.

18. The grill of claim 1 wherein the pan is removable, wherein the at least one housing sidewall comprises at least two rod holes located on opposite sides of the at least one housing sidewall, and further wherein the grill further comprises a removable rod removably extending through the at least two rod holes, the removable rod located below and supporting the pan bottom wall, and further wherein the first set of design holes is located below the at least two rod holes.

19. The grill of claim 1 wherein the pan is removable, and further wherein the grill further comprises a rod located below, supporting the pan bottom wall and extending across the housing width or the housing length.

* * * * *